(12) United States Patent
Lin

(10) Patent No.: US 7,071,988 B2
(45) Date of Patent: Jul. 4, 2006

(54) EXTENSIVE DEVICE FOR USE WITH DIGITAL CAMERA'S DISPLAY TO BE DISPLAYED IN THE SAME DIRECTION AS THE LENS

(75) Inventor: Yu-Chieh Lin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 740 days.

(21) Appl. No.: 10/243,031

(22) Filed: Sep. 13, 2002

(65) Prior Publication Data

US 2003/0107670 A1 Jun. 12, 2003

Related U.S. Application Data

(63) Continuation of application No. 10/217,296, filed on Aug. 12, 2002, now Pat. No. 6,961,003.

(30) Foreign Application Priority Data

Dec. 11, 2001 (TW) ............................. 90130611 A
Mar. 19, 2002 (TW) ............................. 91105234 A

(51) Int. Cl.
*H04N 5/222* (2006.01)
(52) U.S. Cl. .................... 348/369; 348/333.1; 348/375
(58) Field of Classification Search ............. 348/333.1, 348/335, 369, 375

See application file for complete search history.

(56) References Cited

U.S. PATENT DOCUMENTS

| | | | | |
|---|---|---|---|---|
| 5,345,260 | A * | 9/1994 | Petralia | 348/98 |
| 5,637,871 | A * | 6/1997 | Piety et al. | 250/330 |
| 6,452,577 | B1 * | 9/2002 | Gale et al. | 345/87 |
| 6,715,003 | B1 * | 3/2004 | Safai | 710/33 |
| 2002/0186319 | A1 * | 12/2002 | Whitby et al. | 348/375 |

* cited by examiner

*Primary Examiner*—Ngoc-Yen Vu
*Assistant Examiner*—Adam L. Henderson
(74) *Attorney, Agent, or Firm*—Madson & Austin

(57) ABSTRACT

An extensive device for use with a digital camera, including a lens and a display for showing an image received via the lens, is disclosed. The extensive device includes a housing having a window thereon and a cradle for placing the digital camera therein and an optical guiding device disposed inside the housing for guiding the image received via the lens and shown on the display to the window. The window and the lens of the digital camera in the cradle substantially orient the same first direction, so that an image information is recorded via the lens and viewed via the window in the first direction.

21 Claims, 10 Drawing Sheets

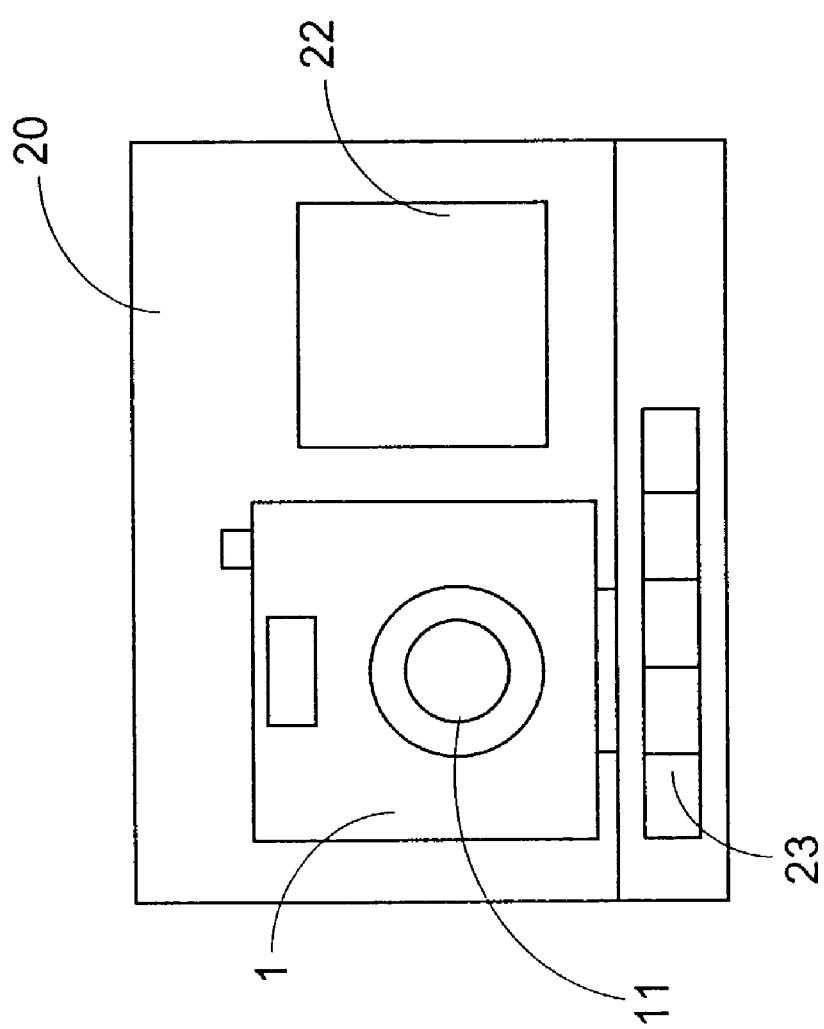

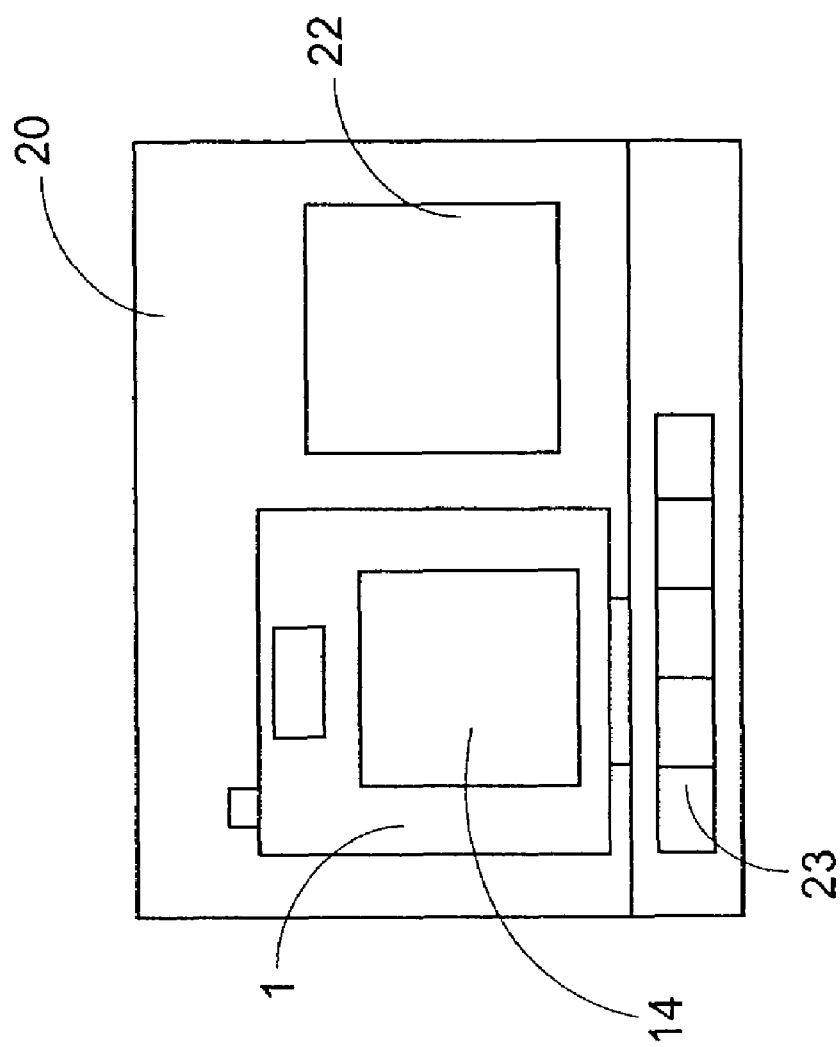

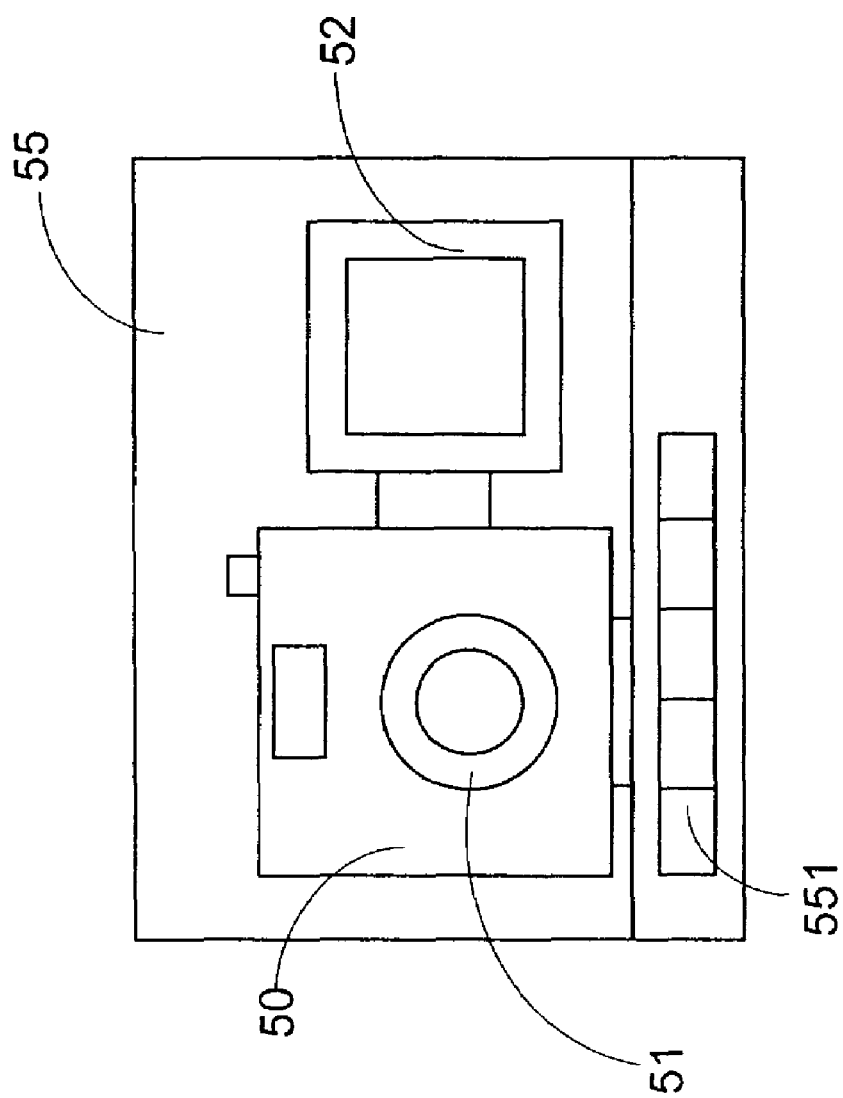

EXTENSIVE DEVICE FOR USE WITH DIGITAL CAMERA'S DISPLAY TO BE DISPLAYED IN THE SAME DIRECTION AS THE LENS

CROSS REFERENCE TO RELATED PATENT APPLICATION

This patent application is a continuation-in-part (CIP) of a U.S. patent application Ser. No. 10/217,296 filed Aug. 12, 2002 now U.S. Pat. No. 6,961,003. The content of the related patent application is incorporated herein for reference.

FIELD OF THE INVENTION

The present invention relates to an extensive device, and more particularly to an extensive device for use with a digital camera.

BACKGROUND OF THE INVENTION

Along with the informationizing and digitalizing trend of the society, a digital still camera (DSC) gradually becomes one of common electrical appliances for the modern family.

Please refer to FIG. 1A which is a schematic diagram showing the front side of a typical digital camera. As shown in FIG. 1A, the digital camera 1 includes a casing 10, a lens 11, a viewfinder 12 and a shutter button 13. The lens 11 is disposed on one surface of the casing 10 for defining an image field of an object. The viewfinder 12 penetrates through the casing 10 for conveying the image of the object from the surface where the lens 11 is disposed to the opposite surface of the casing 10 to be observed by the photographer. The shutter button 13 is also disposed on the casing 10, generally on the to surface thereof, for starting shooting to capture the image of the object of the image field defined by the lens 11 in response to a pressing operation thereon of the photographer. FIG. 1B is a schematic diagram showing the rear side of the typical digital camera. On the rear side of the digital camera as shown in FIG. 1B, a display 14 is disposed. Generally, the display 14 is a liquid crystal display (LCD) for displaying photographing information or parameters as well as synchronously revealing the picking-up frame by the lens 11, which is similar to that observed via the viewfinder 12. Thus, the user can optionally watch the picking-up frame via the display 14 or the viewfinder 12. In addition, the digital camera includes, generally, a signal output end for transmitting therethrough digital data of the captured image to, for example, computer to be stored and/or processed.

Conventionally, a digital camera is only used for taking pictures. In other words, digital cameras are left unused for most families for most of time. Thus, it is cost-inefficient to purchase a digital camera with the only use for taking pictures.

Therefore, the purpose of the present invention is to extend the use of a digital camera.

SUMMARY OF THE INVENTION

An object of the present invention is to provide an extensive device for use with a digital camera, which enables the digital camera to function as an electronic messenger.

According to an aspect of the present invention, there is provided an extensive device for use with a digital camera. The digital camera includes a lens and a display for showing an image received via the lens. The extensive device includes a housing having a window thereon and a cradle for placing the digital camera therein, wherein the window and the lens of the digital camera in the cradle substantially orient the same first direction, and an optical guiding device disposed inside the housing for guiding the image received via the lens and shown on the display to the window so that an image information is recorded via the lens and viewed via the window in the first direction.

Preferably, the optical guiding device includes a reflective mirror set. For example, the reflective mirror set can include at least one reflective mirror.

Preferably, the image received via the lens is processed by a digital signal processor, and stored in a memory.

In an embodiment, the extensive device further includes a detecting device electrically connected to the digital signal processor for detecting an environmental change to trigger the digital camera to automatically display the image information. For example, the detecting device can be a vibration detector for detecting a certain level of vibration to trigger the digital camera to display the image information, or a motion detector for detecting a movement of an environmental object to trigger the digital camera to display the image information.

Preferably, the extensive device further includes a button for optionally enabling or disabling the detecting device so as to have the digital camera automatically or manually display the image information.

Preferably, the display is a liquid crystal display.

In another embodiment, the extensive device further includes a voice information generator. The voice information generator includes a voice input device electrically connected to a digital signal processor of the digital camera for receiving a voice information to be processed by the digital signal processor and stored in a memory of the digital camera, and a voice playing device electrically connected to the digital signal processor of the digital camera for playing the stored voice information. Preferably, the extensive device also includes a button for enabling or disabling the voice information generator so as to allow or disallow the voice information to be recorded and played. For example, the voice input device and the voice playing device can be a microphone and a speaker, respectively.

In a further embodiment, the extensive device further includes a digital tablet electrically connected to a digital signal processor of the digital camera for inputting a word information, and a button for enabling or disabling the digital tablet so as to allow or disallow the word information to be recorded and played.

Preferably, the extensive device further includes a plurality of operating buttons on the housing for starting recording the image information, starting playing the recorded image information, and transmitting the image information to a personal computer, respectively.

According to another aspect of the present invention, there is provided an extensive device for use with a digital camera. The digital camera includes a lens and a display for showing an image received via the lens. The extensive device includes a housing having a window thereon and a cradle for placing the digital camera therein, wherein the window and the display of the digital camera in the cradle substantially orient the same first direction, and an optical guiding device disposed inside the housing for guiding an image from the window to the lens and shown on the display so that an image information is recorded via the window and viewed via the display in the first direction.

According to an additional aspect of the present invention, there is provided an extensive device for use with a digital camera. The digital camera includes a lens and a display for showing an image received via the lens. The extensive device includes a housing having a cradle for placing the digital camera therein, and a detecting device disposed in the housing and electrically connected to a digital signal processor of the digital camera for detecting an environmental change to trigger the digital camera to automatically display an image information.

For example, the detecting device can be a vibration detector or a motion detector. The extensive device preferably includes a button for optionally enabling or disabling the detecting device so as to have the digital camera automatically or manually display the image information.

Preferably, the display is a separate rotatable display. The separate rotatable display is unfolded and rotated to substantially orient the same first direction with the lens when the digital camera is operated with the extensive device.

In an embodiment, the extensive device further includes a window disposed on the housing, wherein the window and the lens of the digital camera in the cradle substantially orient the same first direction. Preferably, the extensive device further includes an optical guiding device disposed inside the housing for guiding the image received via the lens and shown on the display to the window so that an image information is recorded via the lens and viewed via the window in the first direction.

In another embodiment, the extensive device further includes a window disposed on the housing, wherein the window and the display of the digital camera in the cradle substantially orient the same first direction. Preferably, the extensive device further includes an optical guiding device disposed inside the housing for guiding an image from the window to the lens and shown on the display so that an image information is recorded via the window and viewed via the display in the first direction.

BRIEF DESCRIPTION OF THE DRAWINGS

The present invention may best be understood through the following description with reference to the accompanying drawings, in which:

FIG. 3A is a schematic diagram illustrating the front side of the extensive device of FIG. 2 disposed therein a digital camera of FIG. 1 with its lens facing forwards;

FIG. 4A is a schematic diagram illustrating the front side of the extensive device of FIG. 2 disposed therein the digital camera of FIG. 1 with its display facing forwards;

FIG. 6A is a schematic diagram illustrating the front side of a further preferred embodiment of an extensive device according to the present invention, wherein the extensive device is disposed therein a digital camera with a separate rotatable display unit.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 2:
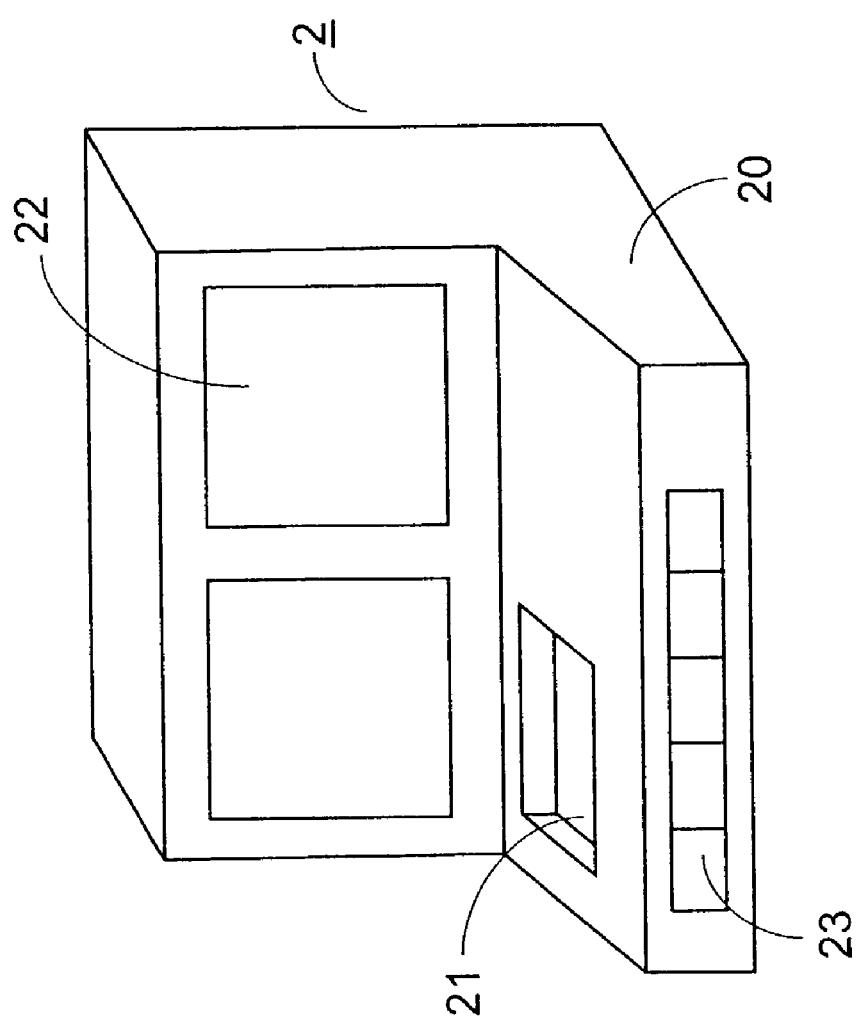
FIG. 2 is a schematic diagram showing the appearance of a preferred embodiment of an extensive device for use with a digital camera according to the present invention.
Figure 3B:
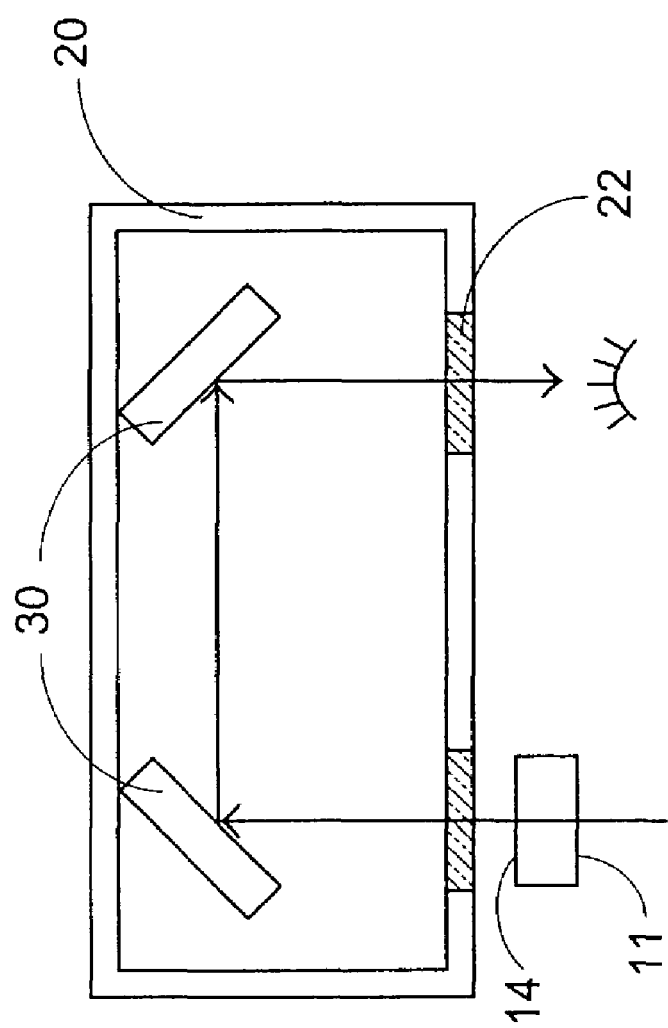
FIG. 3B is a schematic top view illustrating an optical path from the lens of the digital camera to the window of the extensive device via an optical guiding device in under the arrangement of FIG. 3A.
Figure 3C:
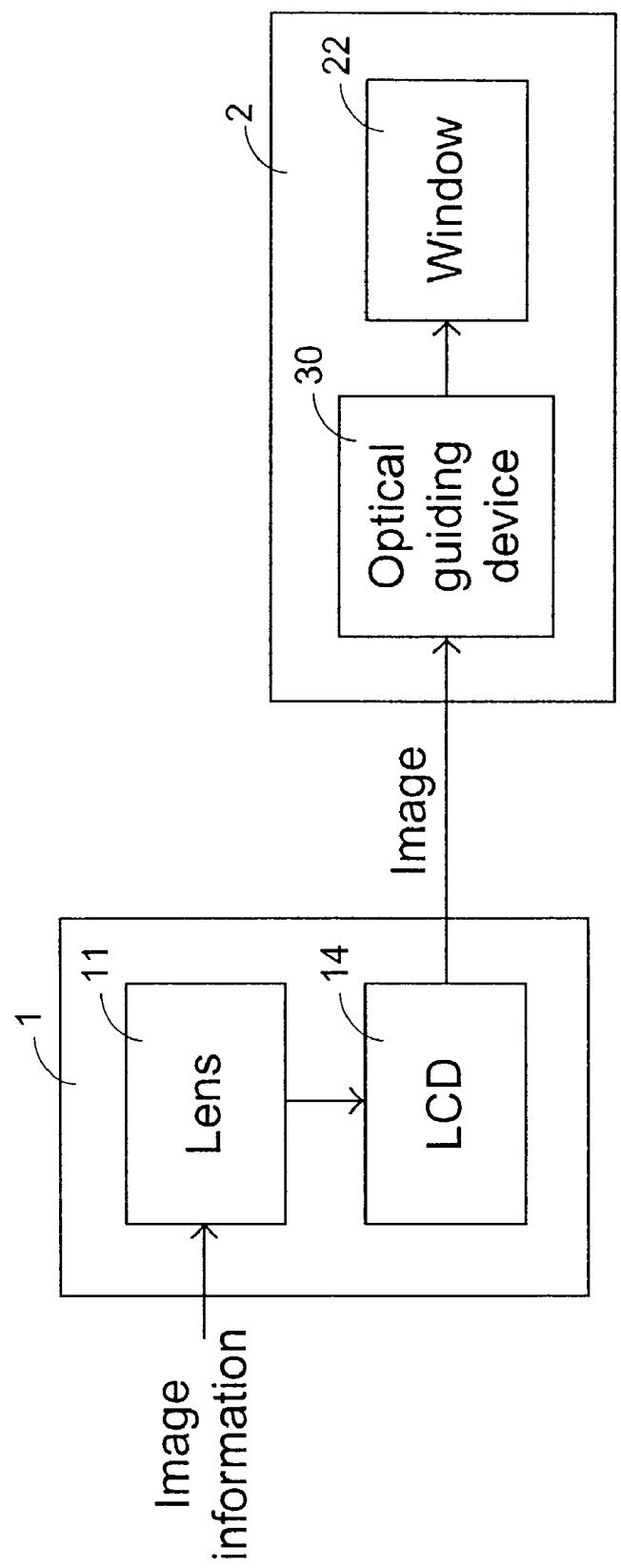
FIG. 3C is a functional block diagram illustrating the use of the extensive device of FIG. 2 with the digital camera of FIG. 1 to record and view image messages in a first manner.

Please refer to FIG. 2 which is a schematic diagram showing the appearance of a preferred embodiment of an extensive device for use with a digital camera according to the present invention. The extensive device 2 includes a housing 20, a cradle 21, a window 22 and a plurality of operating buttons 23, wherein the cradle 21, the window 22 and the buttons 23 are disposed on the housing 20. The cradle 21 is used for accommodating the digital camera 1 therein. Further referring to FIG. 3A, when the digital camera 1 cooperates with the extensive device 2 by being placed into the cradle (not shown) with the lens 11 thereof facing to the user, the digital camera can serve as an electronic messenger for leaving image messages. When the message-leaving function is enabled, the image message of the user is received via the lens 11 and can be simultaneously viewed by the user via the window 22 in the presence of an optical guiding device of the extensive device 2. Please refer to FIG. 3B which schematically shows an embodiment of the optical guiding device. The optical guiding device including reflective mirrors 30 is disposed inside the housing 20 of the extensive device 2. When the digital camera 1 is placed into the cradle 21 with the lens 11 facing forwards, the image received via the lens 11 will be shown on the liquid crystal display (LCD) 14 of the digital camera 1, which is opposite to the lens 11. The optical signal from the LCD 14 is then guided to the window 22 via the reflective mirror set 30, and viewed by the user while recording the image message, as shown in FIG. 3C. When the image message recorded by the digital camera 1 is to be viewed by the receiver, it will be displayed on the LCD 14, and transmitted to the receiver's eyes via the optical guiding device 30 and the window 22 in a similar way. As for the operating buttons 23 on the housing 20 as shown in FIGS. 2 and 3A, they are optionally pressed to enable the functions of starting recording the image information, starting playing the recorded image information, and transmitting the image information to a personal computer.

Figure 1B:
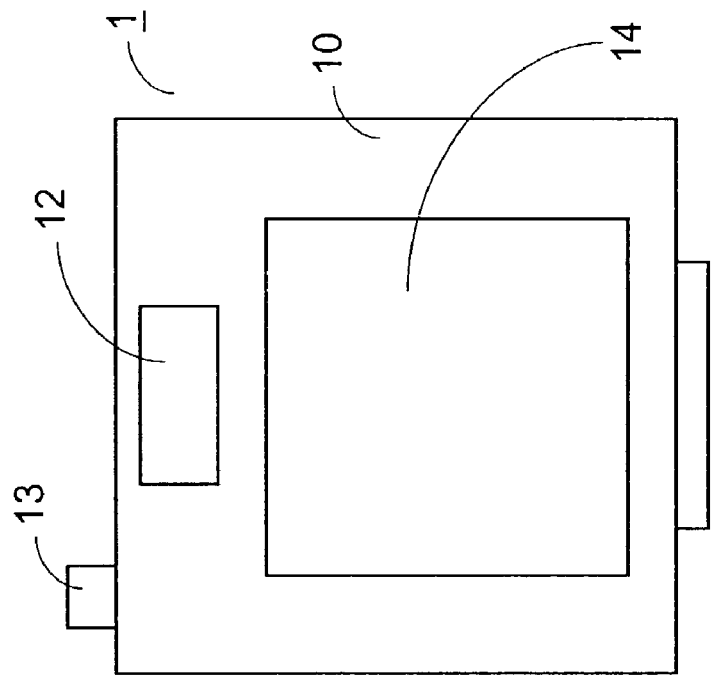
FIG. 1B is a schematic diagram showing the rear side of a digital camera.
Figure 1A:
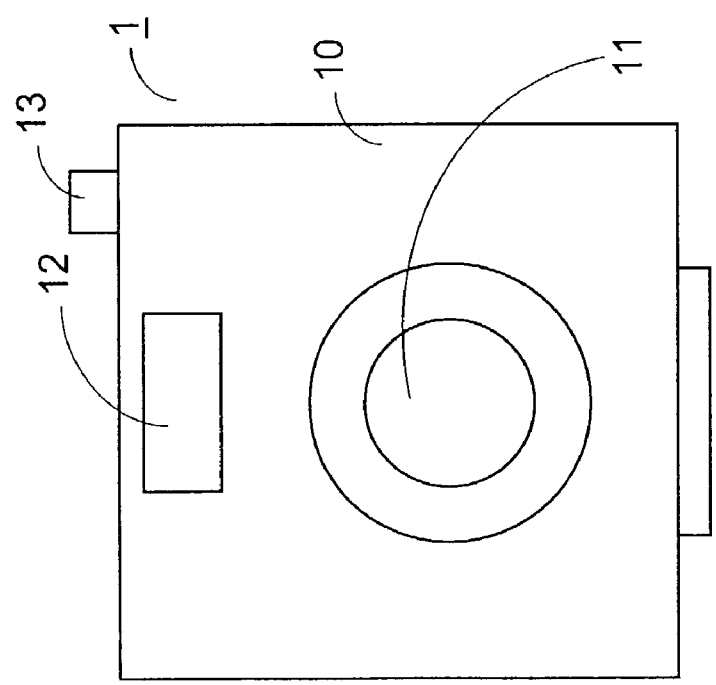
FIG. 1A is a schematic diagram showing the front side of a digital camera.
Figure 4B:
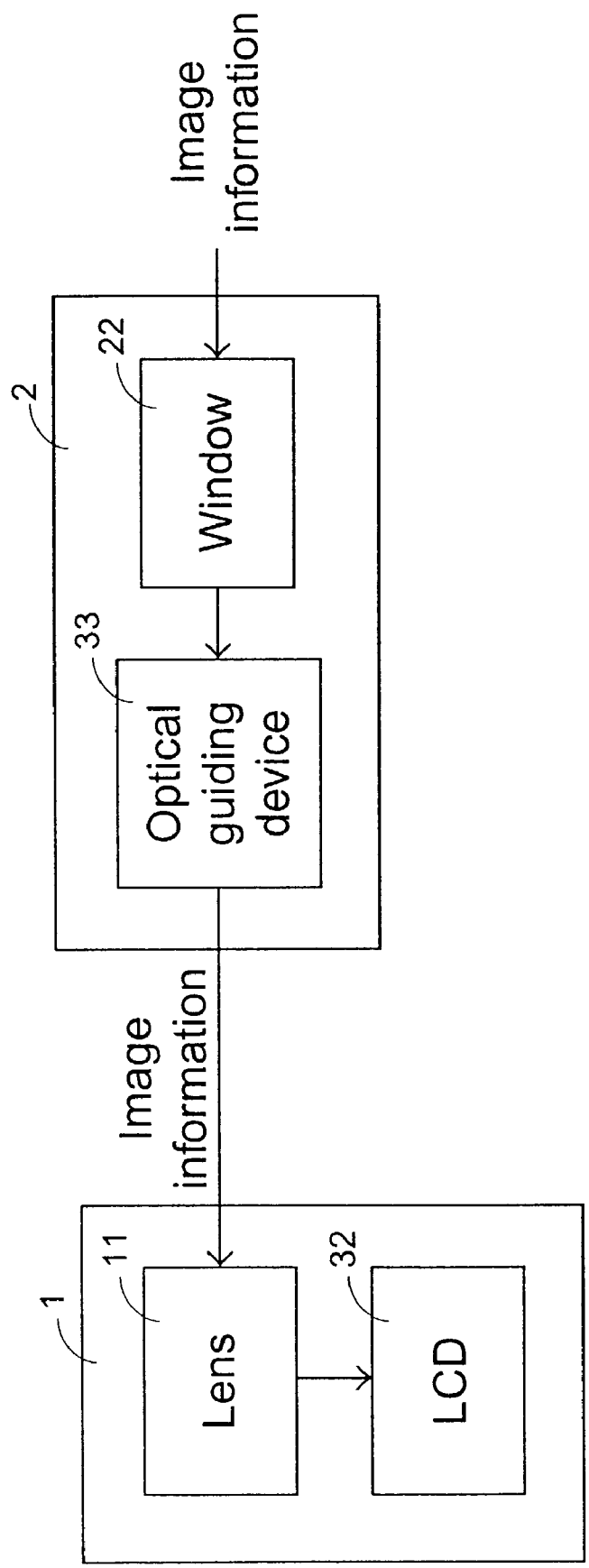
FIG. 4B is a functional block diagram illustrating the use of the extensive device of FIG. 2 with the digital camera of FIG. 1 to record and view image messages in a second manner.

Please refer to FIG. 4A which is a schematic diagram illustrating the front side of the extensive device of FIG. 2 disposed therein the digital camera of FIG. 1 with its display facing forwards. In this embodiment, the digital camera is disposed in the cradle in a manner opposite to the above embodiment with reference to FIG. 3A. The image information of the user enters the window 22 first, and then reaches the lens 11 of the digital camera 1 via the optical guiding device 30 of the extensive device 2 to be recorded, as shown in FIG. 4B. The user may view the image information at the same time from the LCD 14 facing forwards. In this case, the receiver directly views the LCD 14 to get the recorded image information.

Figure 5:
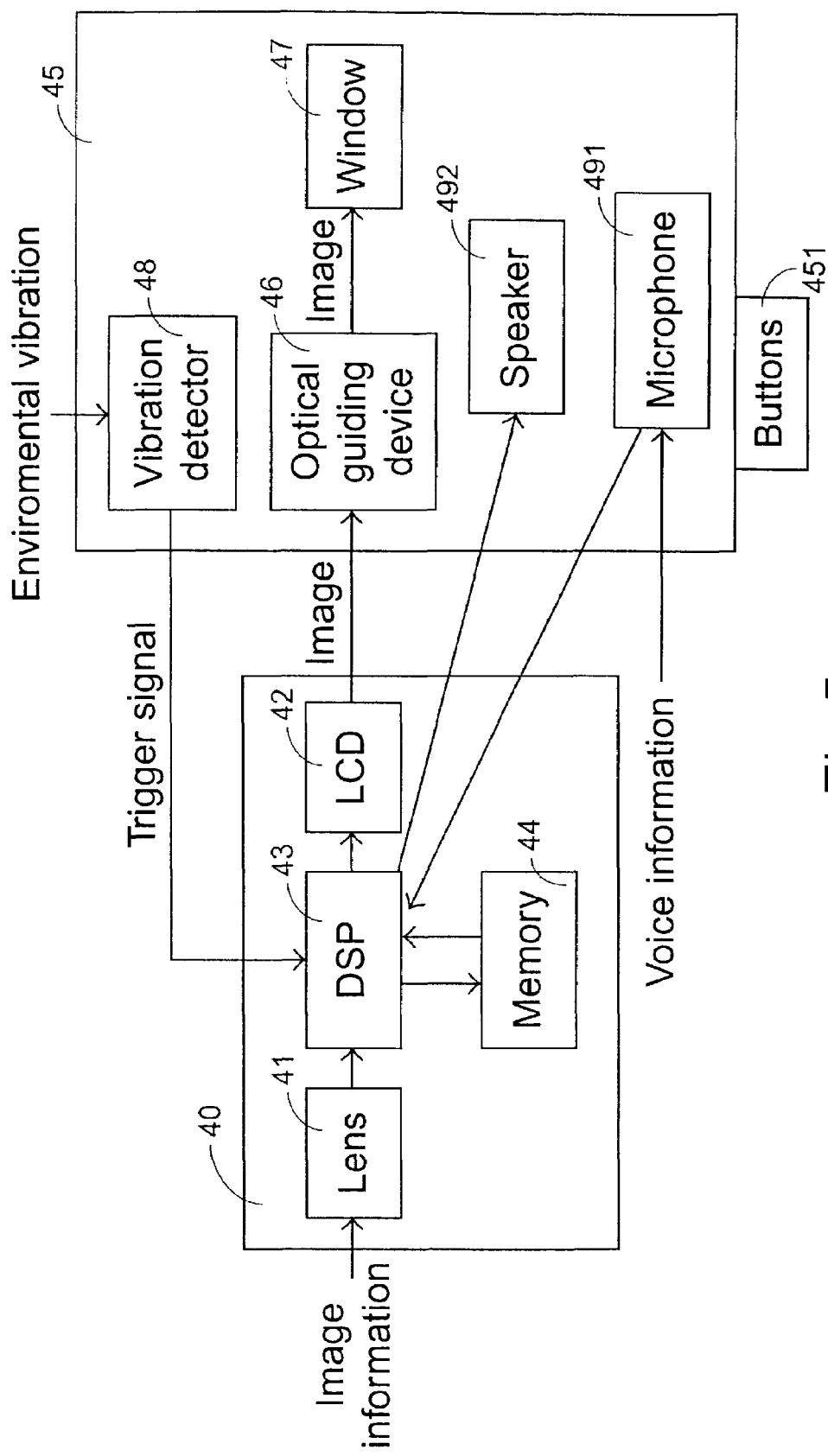
FIG. 5 is a functional block diagram illustrating another preferred embodiment of an extensive device for use with a digital camera according to the present invention.

Please refer to FIG. 5 which is a functional block diagram illustrating another preferred embodiment of an extensive device for use with a digital camera according to the present invention. Typically, a digital camera 40 includes a lens 41, a liquid crystal display 42, a digital signal processor (DSP) 43 and a memory 44. The extensive device 45 in this embodiment is similar to the embodiment of FIG. 3 except that the extensive device 45 further includes a vibration detector 48, a microphone 491 and a speaker 492 in addition to an optical guiding device 46, a window 47 and a plurality of buttons 451 mentioned above, and the recorded information can be played automatically. The microphone 491, the speaker 492, and the vibration detector 48 are electrically connected to the DSP 43 when the digital camera 40 is placed into the cradle of the extensive device 45. According to this embodiment, one or both of the image and voice messages can be recorded and played. One or more of the buttons 451 are used for switching the image/voice messages. When the image and/or voice information are recorded via the lens 41 and/or the microphone 491, respectively, the image and the voice information are stored in the memory 44 of the digital camera via the DSP 43. If any receiver comes near the extensive device 45, the image/voice messages will be played automatically. The coming of the receiver is determined by the vibration detector 48. Once the vibration detector 48 detects an environmental vibration, for example the vibration of the base where the extensive device is located, it will sends out a trigger signal to the DSP 43 to allow the image and/or voice information to be read out. Then, automatically, the visible information, if any, is played on the liquid crystal display 42 and the voice information, if any, is broadcasted from the speaker 492. For making the extensive device with the digital camera prominent and easily detecting the vibration, the extensive device 45 with the digital camera 40, for example, can be positioned on the door of a refrigerator. Once the door of the refrigerator is opened, the vibration detector 48 will detect the vibration and send out the trigger signal to allow the image and/or the voice information to be automatically played. Thus, the extensive deice for use with the digital camera according to the present invention can actively notify the receiver of the presence and the contents of information, thereby extending the function of the digital camera to include an electric messenger function. Of course, the user can disable the vibration detector 48 via one of the buttons 451, so the image and/or the voice information are only played when the receiver pushes or touches the starting button.

Figure 6B:
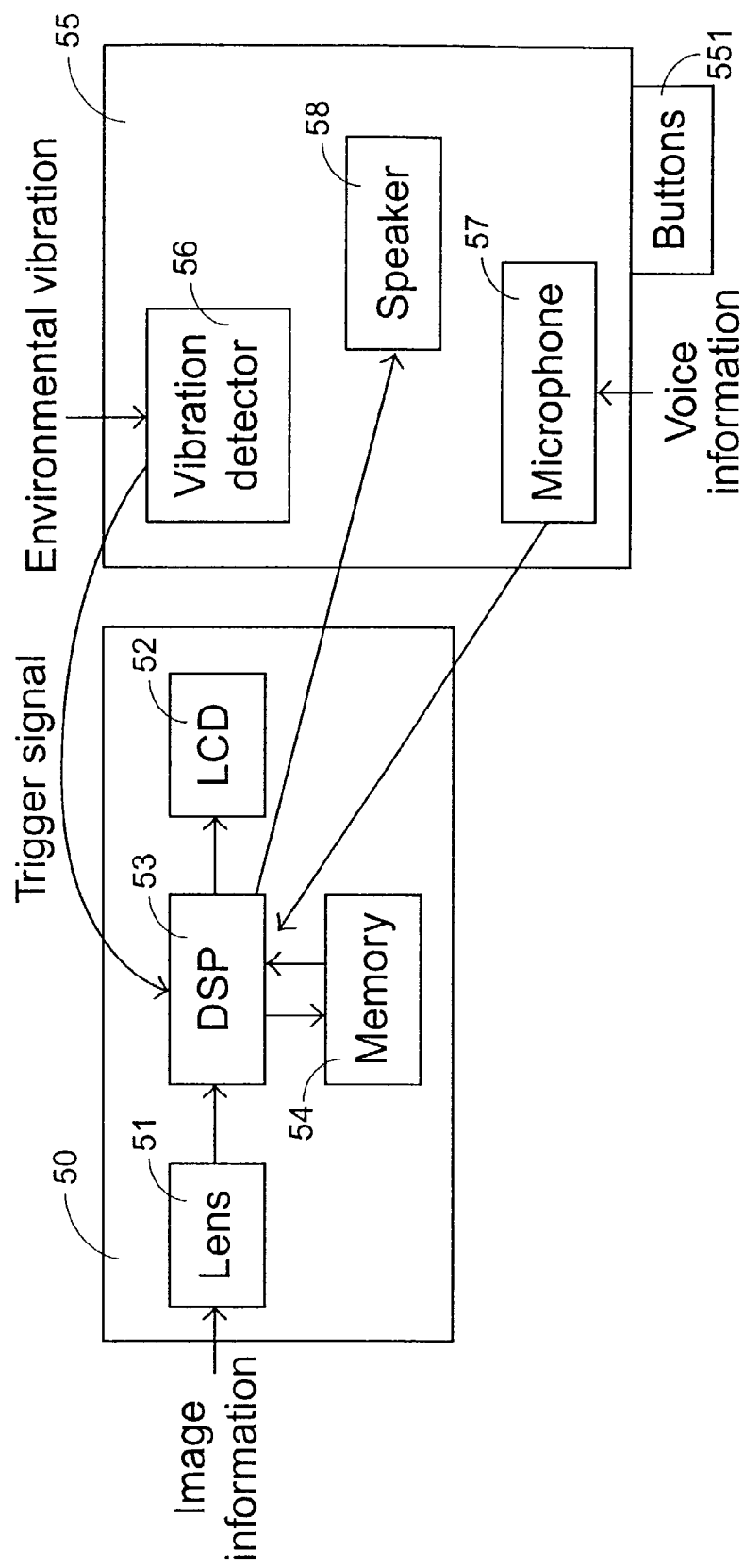
FIG. 6B is a functional block diagram illustrating the use of the extensive device of FIG. 6A with the dispay-rotatable digital camera.

Please refer to FIG. 6A which is a schematic diagram illustrating the front side of a further preferred embodiment of an extensive device according to the present invention, wherein the extensive device is disposed therein a digital camera with a separate rotatable display unit. In this embodiment, the liquid crystal display 52 of the digital camera 50 can be unfolded to substantially orient the same direction as the lens 51. The extensive device of this embodiment is similar to the embodiment of FIG. 5 except that the window 47 shown in FIG. 5 is not required because the user can record image information via the lens 51 and view the image information being recorded directly via the LCD 52. Of course, the optical guiding device can also be omitted in this case. FIG. 6B is a functional block diagram illustrating the use of the extensive device of FIG. 6A with the dispay-rotatable digital camera. Similarly, a digital camera 50 includes a lens 51, a liquid crystal display 52, a digital signal processor (DSP) 53 and a memory 54. The extensive device 55 includes a vibration detector 56, a microphone 57, a speaker 58, and a plurality of buttons 551. The function and structure of the above devices are similar to those in the embodiment of FIG. 5.

In addition to image information and voice information, word information can also be inputted if the extensive device further includes a digital tablet (not shown) electrically connected to the DSP of the digital camera. Similarly, a button is used for enabling or disabling the digital tablet so as to allow or disallow the word information to be recorded and played. In addition, the vibration detector used in the above embodiments can be replaced by a motion detector, e.g. an infrared-ray motion detector.

To sum up, the extensive device for use with a digital camera according to the present invention can extend the functions of digital camera, e.g. to be an electric messenger, for increasing the additional value of the digital camera.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An extensive device for use with a digital camera, said digital camera including a lens and a display for showing an image received via said lens, said extensive device comprising:
    a housing having a window thereon and a cradle for placing said digital camera therein, wherein said window and said lens of said digital camera in said cradle substantially orient in the same first direction;
    an optical guiding device disposed inside said housing for guiding said image received via said lens and shown on said display to said window so that an image information is recorded via said lens and viewed via said window in said first direction, wherein said image received via said lens is processed by a digital signal processor, and stored in a memory; and
    a detecting device electrically connected to said digital signal processor for detecting an environmental change to trigger said digital camera to automatically display said image information, wherein said detecting device is a vibration detector for detecting a certain level of vibration to trigger said digital camera to display said image information.

2. The extensive device according to claim 1 wherein said optical guiding device includes a reflective mirror set.

3. The extensive device according to claim 2 wherein said reflective mirror set includes at least one reflective mirror.

4. The extensive device according to claim 1 further comprising a button for optionally enabling or disabling said detecting device so as to have said digital camera automatically or manually display said image information.

5. The extensive device according to claim 1 wherein said display is a liquid crystal display.

6. The extensive device according to claim 1 further comprising a voice information generator which includes: a voice input device electrically connected to a digital signal processor of said digital camera for receiving a voice information to be processed by said digital signal processor and stored in a memory of said digital camera; and a voice playing device electrically connected to said digital signal processor of said digital camera for playing said stored voice information.

7. The extensive device according to claim 6 further comprising a button for enabling or disabling said voice information generator so as to allow or disallow said voice information to be recorded and played.

8. The extensive device according to claim 6 wherein said voice input device and said voice playing device are a microphone and a speaker, respectively.

9. The extensive device according to claim 1 further comprising: a digital tablet electrically connected to a digital signal processor of said digital camera for inputting a word information; and a button for enabling or disabling said digital tablet so as to allow or disallow said word information to be recorded and played.

10. The extensive device according to claim 1 further comprising a plurality of operating buttons on said housing for starting recording said image information, starting playing said recorded image information, and transmitting said image information to a personal computer, respectively.

11. An extensive device for use with a digital camera, said digital camera including a lens and a display for showing an image received via said lens, said extensive device comprising:
a housing having a window thereon and a cradle for placing said digital camera therein, wherein said window and said lens of said digital camera in said cradle substantially orient in the same first direction;
an optical guiding device disposed inside said housing for guiding said image received via said lens and shown on said display to said window so that an image information is recorded via said lens and viewed via said window in said first direction, wherein said image received via said lens is processed by a digital signal processor, and stored in a memory; and
a detecting device electrically connected to said digital signal processor for detecting an environmental change to trigger said digital camera to automatically display said image information, wherein said detecting device is a motion detector for detecting a movement of an environmental object to trigger said digital camera to display said image information.

12. The extensive device according to claim 11 wherein said optical guiding device includes a reflective mirror set.

13. The extensive device according to claim 12 wherein said reflective mirror set includes at least one reflective mirror.

14. The extensive device according to claim 11 further comprising a button for optionally enabling or disabling said detecting device so as to have said digital camera automatically or manually display said image information.

15. The extensive device according to claim 11 wherein said display is a liquid crystal display.

16. The extensive device according to claim 11 further comprising a voice information generator which includes: a voice input device electrically connected to a digital signal processor of said digital camera for receiving a voice information to be processed by said digital signal processor and stored in a memory of said digital camera; and a voice playing device electrically connected to said digital signal processor of said digital camera for playing said stored voice information.

17. The extensive device according to claim 16 further comprising a button for enabling or disabling said voice information generator so as to allow or disallow said voice information to be recorded and played.

18. The extensive device according to claim 16 wherein said voice input device and said voice playing device are a microphone and a speaker, respectively.

19. The extensive device according to claim 11 further comprising: a digital tablet electrically connected to a digital signal processor of said digital camera for inputting a word information; and a button for enabling or disabling said digital tablet so as to allow or disallow said word information to be recorded and played.

20. The extensive device according to claim 11 further comprising a plurality of operating buttons on said housing for starting recording said image information, starting playing said recorded image information, and transmitting said image information to a personal computer, respectively.

21. An extensive device for use with a digital camera, said digital camera including a lens and a display for showing an image received via said lens, said extensive device comprising: a housing having a window thereon and a cradle for placing said digital camera therein, wherein said window and said display of said digital camera in said cradle substantially orient the same first direction; and an optical guiding device disposed inside said housing for guiding an image from said window to said lens and shown on said display so that an image information is recorded via said window and viewed via said display in said first direction.

* * * * *